(12) United States Patent
Berkmo et al.

(10) Patent No.: US 12,216,200 B2
(45) Date of Patent: Feb. 4, 2025

(54) AIRPORT STAND ARRANGEMENT

(71) Applicant: ADB Safegate Sweden AB, Malmö (SE)

(72) Inventors: Anders Berkmo, Malmö (SE); Peter Håkansson, Malmö (SE); Alexander Strandberg, Malmö (SE)

(73) Assignee: ADB SAFEGATE SWEDEN AB, Malmö (SE)

( * ) Notice: Subject to any disclaimer, the term of this patent is extended or adjusted under 35 U.S.C. 154(b) by 681 days.

(21) Appl. No.: 17/420,147

(22) PCT Filed: Jan. 9, 2020

(86) PCT No.: PCT/EP2020/050407
§ 371 (c)(1),
(2) Date: Jul. 1, 2021

(87) PCT Pub. No.: WO2020/144264
PCT Pub. Date: Jul. 16, 2020

(65) Prior Publication Data
US 2022/0066025 A1      Mar. 3, 2022

(30) Foreign Application Priority Data
Jan. 11, 2019    (EP) ..................................... 19151380

(51) Int. Cl.
*G01S 13/86*      (2006.01)
*B64F 1/00*       (2006.01)
(Continued)

(52) U.S. Cl.
CPC .............. *G01S 13/91* (2013.01); *B64F 1/002* (2013.01); *G01S 13/865* (2013.01);
(Continued)

(58) Field of Classification Search
CPC ...... B64F 1/002; G01S 13/865; G01S 13/867; G01S 13/91; G01S 2013/916; G06F 3/14;
(Continued)

(56) References Cited

U.S. PATENT DOCUMENTS 5,629,691 A      5/1997  Jain
5,675,661 A  *  10/1997  Richman ................. B64F 1/002
                                                382/104
(Continued)

FOREIGN PATENT DOCUMENTS

DE          4009668 A1    10/1991
DE       102014112269 A1   3/2016
(Continued)

OTHER PUBLICATIONS

J. Chinrungrueng, et al., "Smart Parking: An Application of Optical Wireless Sensor Network," 2007 International Symposium on Applications and the Internet Workshops, Hiroshima, Japan, Jan. 15, 2007, pp. 66-66, doi: 10.1109/SAINT-W.2007.98.
(Continued)

*Primary Examiner* — Timothy A Brainard
(74) *Attorney, Agent, or Firm* — XSENSUS LLP

(57) ABSTRACT

The disclosure relates to airport stand arrangement (100, 200,300) comprising: a display (130); a radar-based system (110R); and one or more additional systems selected from laser-based systems (110L) and imaging systems (110C), wherein said radar-based system (110R) and said one or more additional systems together form a combined system (110,210,310), wherein the airport stand arrangement (100) is configured, based on output data from said combined system (110), to detect and track (S108,S110) an aircraft (10) within a stand area (20) when said aircraft (10) is approaching a stand within the stand area (20) for parking at a parking position (160) therein, and configured, based on
(Continued)

said detection and tracking of the approaching aircraft (10), to provide (S114,S116) pilot maneuvering guidance information on said display (130) for aiding a pilot of the approaching aircraft (10) in maneuvering the aircraft (10) towards said parking position (160).

25 Claims, 9 Drawing Sheets

(51) Int. Cl.
    *G01S 13/91*     (2006.01)
    *G06F 3/14*     (2006.01)
    *G08G 5/00*     (2006.01)
    *G08G 5/06*     (2006.01)

(52) U.S. Cl.
    CPC ............. *G01S 13/867* (2013.01); *G06F 3/14* (2013.01); *G08G 5/0017* (2013.01); *G08G 5/065* (2013.01); *G01S 2013/916* (2013.01)

(58) Field of Classification Search
    CPC .. G08G 5/0017; G08G 5/0021; G08G 5/0026; G08G 5/065
    See application file for complete search history.

(56) References Cited

U.S. PATENT DOCUMENTS

| | | | |
|---|---|---|---|
| 5,889,479 A * | 3/1999 | Tabel | G01S 17/06 340/958 |
| 6,282,488 B1 | 8/2001 | Castor et al. | |
| 9,014,956 B2 | 4/2015 | Breuing | |
| 10,255,520 B2 * | 4/2019 | Deng | G01S 17/06 |
| 11,538,349 B2 | 12/2022 | Poojary et al. | |
| 2011/0187580 A1 | 8/2011 | Laenen et al. | |
| 2013/0060457 A1 | 3/2013 | Breuing | |
| 2013/0062459 A1 * | 3/2013 | Cox | B64C 25/405 244/50 |
| 2013/0176425 A1 * | 7/2013 | Lerner | H04N 21/8153 348/135 |
| 2015/0021431 A1 * | 1/2015 | Kracht | B64C 25/405 244/50 |
| 2015/0262492 A1 | 9/2015 | Barnes et al. | |
| 2017/0178520 A1 | 6/2017 | Papageorgiou et al. | |
| 2017/0226764 A1 | 8/2017 | Nussbaum | |
| 2017/0262732 A1 | 9/2017 | Deng et al. | |
| 2018/0022347 A1 | 1/2018 | Myers et al. | |
| 2019/0050692 A1 * | 2/2019 | Sharma | G06F 18/254 |
| 2019/0310373 A1 * | 10/2019 | Rutkiewicz | B64D 47/02 |
| 2022/0066025 A1 | 3/2022 | Berkmo et al. | |

FOREIGN PATENT DOCUMENTS

| | | |
|---|---|---|
| EP | 0480128 A1 | 4/1992 |
| EP | 2205990 A1 | 7/2010 |
| EP | 3680689 A1 | 7/2020 |
| JP | H10-170646 A1 | 6/1998 |
| JP | 2001-187599 A | 7/2001 |
| JP | 4071412 B2 | 4/2008 |
| KR | 2008-0113194 A | 12/2008 |
| WO | 90/13104 A1 | 11/1990 |
| WO | 2007/108726 A1 | 9/2007 |
| WO | 2009/047292 A1 | 4/2009 |
| WO | 2017/162432 A1 | 9/2017 |

OTHER PUBLICATIONS

V. L. Tran, et al., "A study on ship automatic berthing with assistance of auxiliary devices," International Journal of Naval Architecture and Ocean Engineering, vol. 4, Issue 3, pp. 199-210, Sep. 1, 2012, ISSN 2092-6782, https://doi.org/10.2478/IJNAOE-2013-0090.

C. Mi, et al., "Ship Identification Algorithm Based on 3D Point Cloud for Automated Ship Loaders," Journal of Coastal Research, Special Issue No. 73, pp. 28-34, Jan. 1, 2015.

K. Thupakula, "Data Fusion Techniques for Object Identification in Airport Environment," SAE Technical Paper 2017-01-2109, Sep. 19, 2017, doi.org/10.4271/2017-01-2109.

I. Miller, et al., "Team Cornell's Skynet: Robust Perception and Planning in an Urban Environment," Journal of Field Robotics, vol. 25, Issue 8, Jul. 23, 2008.

O. Schumann, et al., "Semantic Segmentation on Radar Point Clouds," 2018 21st International Conference on Information Fusion (FUSION), Jul. 10, 2018.

A. Aldoma, et al., "Tutorial: Point Cloud Library: Three-Dimensional Object Recognition and 6 DoF Pose Estimation," IEEE Robotics & Automation Magazine vol. 19, No. 3, pp. 80-91, Sep. 11, 2012.

I. Miller, et al., "Sensitivity Analysis of a Tightly-Coupled GPS/INS System for Autonomous Navigation," IEEE Transactions on Aerospace and Electronic Systems, vol. 48, Issue 2, pp. 1115-1135, No. 2, Apr. 5, 2012.

J. Mund, et al., "Introducing LiDAR Point Cloud-based Object Classification for Safer Apron Operations," International Symposium on Enhanced Solutions for Aircraft and Vehicle Surveillance Applications, Apr. 7, 2016.

I. Miller, et al., "Efficient Unbiased Tracking of Multiple Dynamic Obstacles Under Large Viewpoint Changes," IEEE Transactions on Robotics, vol. 27, Issue 1, pp. 29-46, Nov. 22, 2010.

F. Havlak, et al., "Discrete and Continuous, Probabilistic Anticipation for Autonomous Robots in Urban Environments," IEEE Transactions on Robotics, vol. 30, Issue 2, pp. 461-474, Dec. 11, 2013.

I. Miller, et al., "Map-Aided Localization in Sparse Global Positioning System Environments using Vision and Particle Filtering," Journal of Field Robotics, vol. 28, No. 5, pp. 619-643, Aug. 9, 2011.

M. E. Campbell, et al., "Distributed Data Fusion: Neighbors, Rumors, and the Art of Collective Knowledge," IEEE Control Systems Magazine, vol. 36, Issue 4, pp. 83-109, Jul. 18, 2016.

J. Deng, et al., "ImageNet: A Large-Scale Hierarchical Image Database," 2009 IEEE Conference on Computer Vision and Pattern Recognition, Jun. 20, 2009.

R. B. Rusu, et al., "3D is here: Point Cloud Library (PCL)," 2011 IEEE International Conference on Robotics and Automation (ICRA), May 9, 2011.

C.Y. Ip, et al., "Retrieving Matching CAD Models by Using Partial 3D Point Clouds," Computer-Aided Design and Applications, vol. 4, Issue 5, pp. 629-638, Aug. 5, 2007.

W. Wohlkinger, et al., "3DNet: Large-Scale Object Class Recognition from CAD Models," 2012 IEEE International Conference on Robotics and Automation, May 14, 2012.

R. Vock, et al., "Fast Template Matching and Pose Estimation in 3D Point Clouds," Computers & Graphics, vol. 79, pp. 36-45, Jan. 17, 2019.

C. R. Qi, et al., "PointNet: Deep Learning on Point Sets for 3D Classification and Segmentation," 2017 IEEE Conference on Computer Vision and Pattern Recognition, Jul. 21, 2017.

Y. Wang, et al.,, "Pseudo-LiDAR from Visual Depth Estimation: Bridging the Gap in 3D Object Detection for Autonomous Driving," 2019 IEEE/CVF Conference on Computer Vision and Pattern Recognition, Jun. 15, 2019.

Y. Bar-Shalom, et al., "Estimation with Applications To Tracking and Navigation: Theory Algorithms and Software," John Wiley & Sons, Jan. 4, 2002.

A. Petrovskaya, et al., "Model based vehicle detection and tracking for autonomous urban driving," Autonomous Robots, vol. 26, pp. 123-139, Apr. 1, 2009.

International Search Report and Written Opinion mailed on Apr. 8, 2020, received for PCT Application PCT/EP2020/050407, Filed on Jan. 9, 2020, 13 pages.

Extended European Search Report mailed on Jun. 25, 2019, received for EP Application 19151380.3, 9 pages.

Office Action mailed on Apr. 1, 2021, received for EP Application 19151380.3, 6 pages.

(56) References Cited

OTHER PUBLICATIONS

Written Opinion of the International Preliminary Examining Authority mailed on Aug. 17, 2020, received for PCT Application PCT/EP2020/050407, Filed on Jan. 9, 2020, 10 pages.

* cited by examiner

AIRPORT STAND ARRANGEMENT

CROSS-REFERENCE TO RELATED APPLICATIONS

The present application is based on PCT filing PCT/EP2020/050407, filed Jan. 9, 2020, which claims priority to EP 19151380.3, filed Jan. 11, 2019, the entire contents of each are incorporated herein by reference.

FIELD OF THE INVENTION

The present invention relates to an airport stand arrangement. More specifically, the disclosure relates to an airport stand arrangement configured to aid a pilot of an approaching aircraft in maneuvering the aircraft towards a parking position at the stand.

BACKGROUND ART

Safe and reliable docking of aircrafts to stands at airports is today most often achieved by means of aircraft stand arrangements, such as aircraft docking systems, arranged locally at the stands of the airport, wherein each aircraft docking system is configured to aid the pilot, and sometimes also the ground crew, in receiving the aircraft at the stand in a safe and reliable way. Often, such aircraft stand arrangements comprise means for establishing a position of the aircraft as it approaches the stand, said means often being a remote sensing detection system, such as a laser scanning system. Typically, the aircraft stand arrangements known in the art are configured to analyze position data from the aircraft, and potentially also other input parameters, and, based on the parameters, determine pilot maneuvering guidance information on a display of the aircraft stand arrangements for aiding a pilot of the approaching aircraft in maneuvering the aircraft towards a predetermined parking position at the stand.

A challenge with existing arrangements is that they often rely on optical sensing techniques which are less accurate, or even not applicable, in low visibility weather conditions, such as e.g. rain, fog or snow. Moreover, as at least some remote sensing detection systems rely on measuring and interpreting a backscattered signal from the aircraft, the quality of the signal will depend on the surface characteristics of the aircraft itself. Conventional aircrafts most often comprise exterior surface parts of steel, which provide an efficient backscattering. However, as there is an increasing use of non-metallic composite materials in today's aircrafts for weight reduction, conventional aircraft docking systems may have difficulty in detecting these planes with enough accuracy.

A further problem is that it is sometimes difficult to detect enough surface of the aircraft for assessing aircraft data, such as position, dimensions, and aircraft type. A specific challenge in this respect is to successfully determine and track the angle of approach of the aircraft with respect to the lead-in line of the stand. Also, spatial resolution may be inadequate for successfully determining the aircraft type.

Thus, there is a need in the art for an improved aircraft stand arrangement.

SUMMARY

It is an object to mitigate, alleviate or eliminate one or more of the above-identified deficiencies in the art and disadvantages singly or in any combination and solve at least the above-mentioned problem. According to a first aspect there is provided an airport stand arrangement comprising:

a display;
a radar-based system; and
one or more additional systems selected from laser-based systems and imaging systems,
wherein said radar-based system and said one or more additional systems together form a combined system,
wherein the airport stand arrangement is configured, based on output data from said combined system, to detect and track an aircraft within a stand area when said aircraft is approaching a stand within the stand area for parking at a parking position therein, and configured, based on said detection and tracking of the approaching aircraft, to provide pilot maneuvering guidance information on said display for aiding a pilot of the approaching aircraft in maneuvering the aircraft towards said parking position.

The airport stand arrangement may be advantageous as it allows for combining more than one remote sensing technique to detect and track the aircraft. As each remote sensing technique has its specific strengths and weaknesses, the proposed airport stand arrangement may thus be more versatile in different situations. Specifically, it provides a means for meeting the problems of the prior art systems. For example, the radar-based system provides increased sensitivity in low visibility conditions. Moreover, the radar-based system is more sensitive to the composite materials of modern aircrafts as radar signal backscattering is sufficiently strong from these materials to result in a good signal-to-noise ratio. Imaging systems provide an improved spatial resolution in good weather. Imaging systems also generally provide a higher repetition rate for faster objects, and are less expensive. As will be shown later, a further advantage of the airport stand arrangement is that it allows accurate detection and tracking of other objects present in a stand area.

The airport stand arrangement may consist of several interconnected units, wherein each unit may be disposed at different positions at, or around the gate area. However, the airport stand arrangement is disposed at the stand area and is not configured to detect and track aircrafts at other parts of the airport, such as e.g. the taxi lines, or the runways. The airport stand arrangement may be an aircraft docking system.

The radar-based system is a remote sensing detection system based on microwave electromagnetic radiation. Such systems emit continuous or pulsed radar signals towards a target and capture and detect radar pulses backscattered from the target. The radar system may comprise a radar sensor of semi-conductor type. For example, the radar sensor may be of the kind used within the automotive industry. The radar sensor may operate at 77 GHz.

The laser-based system is a remote sensing detection system based on optical electromagnetic radiation. Such systems emit continuous or pulsed laser radiation towards a target and capture and detect laser radiation backscattered from the target. The laser-based system may comprise beam deflecting means for providing scanning capabilities. Such beam deflecting means may be e.g. a scanning mirror arrangement.

The imaging system may comprise a camera sensitive to optical or infrared radiation. The imaging system may be used to capture the emission of natural radiation from the target. However, it is also conceivable that the camera is used to capture radiation emitted from the target as a result from the laser-based system. Such radiation may be scattered or reflected laser radiation, fluorescence, phosphorescence and the like.

According to some embodiments, said one or more additional systems are selected from laser-based systems only.

According to some embodiments, said one or more additional systems are selected from imaging systems only.

According to some embodiments, said one or more additional systems comprise at least one laser-based system and at least one image-based system.

The airport stand arrangement further comprises control means for controlling, and performing, said detection and tracking. The control means may comprise a separate control unit of the airport stand arrangement, but may alternatively comprise several control units. For example, each system of the combined system may comprise a respective control unit. It is readily realized by the skilled person that many physical embodiments exist within the scope of the claims.

Each system of the combined system provides a respective coverage at the stand area. Preferably, the respective coverages at least partially overlap each other. It is however conceivable for some embodiments that two or more of said respective coverages do not overlap each other.

According to some embodiments, the airport stand arrangement is configured to detect and track the approaching aircraft based on combined output data from said radar-based system, on the one hand, and from said one or more additional systems, on the other hand.

This may be advantageous as it allows for increasing the overall accuracy of the detection and tracking. In some situations, one system of the combined system may be more accurate than another one. The airport stand arrangement may then predominately base its detection and tracking on the output data from the most accurate system. It is also conceivable that different systems show a varying accuracy or sensitivity at different spatial locations of the stand area, or different spatial positions of the approaching aircraft. Thus, it is conceivable that the detection and tracking is based on output data from the two or more systems in different relative weights dependent on spatial position. It is also conceivable that the two or more systems have partly different areas of coverage at the stand area. In such a case, it may be possible to detect an aircraft with one system as the aircraft enters the stand area, and then automatically shift to another more accurate system when the aircraft has entered the area of coverage of that system.

The airport stand arrangement may be configured to detect and track the approaching aircraft based on a spatially resolved weighted average of the combined output data, wherein the weighted average is determined based on statistical weights for the radar system and the one or more additional systems, respectively.

The statistical weights may be predetermined, such as retrieved from a database, or user input. Alternatively, statistical weights may be determined by the airport stand arrangement. The airport stand arrangement may be configured to determine the statistical weights based on associated output data from the respective systems of the combined system. The airport stand arrangement may be configured to determine a visibility based on output data from said one or more additional systems and determine said statistical weights based on said visibility.

The weighted average may be spatially resolved. This implies that the weighted average may be based on output data pertaining to the same spatial location in the stand area. Thus, the area of coverage of the radar system may overlap with the areas of coverage of the one or more additional systems. The weighted average of the combined output data may be used to determine spatially resolved information pertaining to the position of the approaching aircraft.

The airport stand arrangement may be configured to determine, based on output data from a first system of the combined system, if a second system of the combined system is to be used instead of, or in combination with the first system to detect and track the approaching aircraft.

The combined system may comprise a laser-based system and an imaging system, the airport stand arrangement being configured to determine, based on output data from the laser-based system, if the imaging system is to be used instead of, or in combination with the laser-based system to detect and track the approaching aircraft. The airport stand arrangement may be configured to determine a visibility based on output data from one or more of said additional systems and determine if the imaging system is to be used instead of, or in combination with the laser-based system based on said visibility.

Laser-based systems may have a shorter life expectancy than radar-based systems. Thus, it may be beneficial to allow an airport stand arrangement equipped with such a laser-based system to minimize usage of the laser-based system.

The airport stand arrangement may be configured to determine if detecting and tracking of the approaching aircraft and/or other objects in the stand area can be based on output data from the radar-based system, and, if the airport stand arrangement determines that detecting and tracking of the approaching aircraft and/or other objects in the stand area cannot be based on output data from the radar-based system:

initiate detection and tracking of the aircraft and/or other objects within the stand area using the one or more additional systems.

The one or more additional systems may comprise a laser-based system and an imaging system used in combination. For example, the airport stand arrangement may be configured to detect and track the approaching aircraft based on combined output data from a laser-based system and an imaging system. This implies that the area of coverage of the laser-based system and the area of coverage of the imaging system at least partly overlaps.

According to some embodiments, the one or more additional systems include an imaging system, and wherein the airport stand arrangement is configured to:

detect and track an object of said other objects based on output data from the imaging system, and verify the existence of said detected and tracked object based on output data from a further system of the one or more additional systems and/or output data from the radar-based system.

The imaging system may provide output data having higher spatial resolution than the output data of the radar-based system and/or the output data of the laser-based system. This may be an advantage as the imaging system may spot also smaller objects present in the stand area. However, object detection based on images may result in image artifacts such as shadows being erroneously identified as real objects. By verifying the alleged existence of the object with the radar-based system and/or e.g. a laser-based system, this potential drawback of the imaging system may be overcome.

According to some embodiments, two or more systems of the combined system are each distanced from each other so as to, at each position in time, detect the approaching aircraft using different collection angles.

This may be advantageous as it allows for extending the overall coverage of the airport stand arrangement. For example, one system of the combined system may be arranged to detect an approaching aircraft from the side, and another system of the combined system from the front. This may be especially advantageous for providing output data that is more reliable for predicting the angle of the approaching aircraft. At some airport stands, the aircraft has to maneuver along a relatively narrowly curved lead-in line for arriving at the stand. Such stand areas may, preferably, be equipped with an aircraft stand arrangement having such distanced systems of the combined systems.

According to some embodiments, at least one system of the combined system is arranged such that an associated area of coverage thereof extends over a portion of the stand area which portion at least partly overlaps with a part of the stand area being blocked, by a blocking structure in the stand area, from detection and tracking using said remaining systems of the combined system.

According to some embodiments, the blocking structure in the stand area is a passenger bridge. However, the blocking structure may alternatively be a part of a building or another more or less permanent structure present in the stand area.

According to some embodiments, said at least one system is arranged on, or at, the blocking structure.

This may be advantageous as it allows the airport stand arrangement to monitor "dark areas" which are otherwise blocked out of view by large objects such as e.g. a passenger bridge present in the stand area. If at least one system of the combined system is arranged on, or at, the blocking structure, the portion of the stand area being effectively blocked from view of the remaining systems may be specifically targeted using the at least one system.

The radar-based system may be arranged so as to emit radar radiation in a direction along the lead-in line towards the approaching aircraft. This implies that the radar-based system may be disposed at, or in a vicinity of, the display.

According to some embodiments, the airport stand arrangement is further configured to determine a visibility based on output data from one or more of said additional systems. Visibility may be determined using the laser-based system. For example, the visibility may be determined based on the ratio between backscattered laser radiation and emitted laser radiation. Visibility may alternatively or additionally be determined using the imaging system. For example, the visibility may be determined by comparing different spatial regions of captured images. Visibility may be based on output data from one system of the combined system, but may alternatively be based on output data from two or more systems of the combined system. For example, a visibility could be determined based on a weighted average of a respective visibility determined by each system of the combined system.

According to some embodiments, the airport stand arrangement is configured, in response to said visibility being lower than a first visibility threshold, to detect and track the approaching aircraft based on output data from the radar based system.

This may be advantageous as it allows for reducing the influence of visibility conditions on the accuracy and sensitivity of the detection and tracking of the airport stand arrangement. For example, the airport stand arrangement may be configured to detect and track the aircraft based on output data from a laser-based system as a default setting, and, as a visibility is determined to be lower than the first visibility threshold, switch from the laser-based system to the radar-based system so as to, instead, detect and track the aircraft based on output data from the radar-based system.

The area of coverage of the radar-based system may be larger than the area of coverage of any one of the additional systems. Specifically, a detection and tracking range of the radar-based system may be longer than a detection and tracking range of any one of the additional systems. The longer range of the radar-based system may be advantageous as it allows for detecting and tracking the approaching aircraft earlier during approach. Moreover, it allows utilizing the airport stand arrangement for airport stands where the distance between the stop position and the position at which a detection system is located is longer than usual. This may be for example for stand areas where one or more systems of the combined system for practical reasons needs be mounted on a building, such as an airport terminal building, which is located at some distance from the stop position. If the distance between the stop position and the position at which a detection system is located is too long, such as more than 65 meters, the area of coverage, e.g. the range, of the one or more systems of the combined system may not be sufficient for detecting and tracking the approaching aircraft.

At some weather conditions, such as fog, mist, snow, rain and sand storms, the laser-based system and/or the imaging system may not be able to detect and track the approaching aircraft due to high degree of atmospheric backscattering from air-borne scatterers (rain drops, sand etc.). During such conditions, the radar-based system may be able to detect the aircraft. An advantage of using the radar-based system in combination with the one or more additional systems is that the approaching aircraft may be allowed to approach further into the stand area even in situations where the one or more additional systems may not be able to detect the approaching aircraft e.g. due to bad weather conditions. Thus, the airport stand arrangement may allow aircrafts to approach the stand also in weather conditions where conventional airport stand arrangements would have to indicate to abort the approach. However, the one or more additional systems may be more accurate in detecting and tracking the aircraft than the radar-based system if only the aircraft is close enough to be within range. For example, the one or more additional systems may provide output data from which it is possible to accurately determine the aircraft type and/or model. For some weather conditions, it may be possible for the one or more additional systems to perform such detection and tracking if only the approaching aircraft is allowed to come within the area(s) of coverage of the one or more additional systems.

According to some embodiments, an area of coverage of the radar-based system extends further out from the parking position than associated areas of coverage of said one or more additional systems as defined along a direction along which the approaching aircraft is expected to enter the stand area, wherein the airport stand arrangement is configured to, based on output data from the radar-based system, detect and track the approaching aircraft in the area of coverage of the radar-based system for allowing the approaching aircraft to approach the stand and enter into the associated areas of coverage of the one or more additional systems, and whereby the airport stand arrangement is configured to, based on output data from said one or more additional systems, detect and track the approaching aircraft within associated areas of coverage of said one or more additional system.

This may be advantageous as it allows for the airport stand arrangement to utilize the long-range capabilities of the radar-based system to perform a first detection and tracking of the approaching aircraft already when the approaching aircraft is located at some distance from the stand area beyond reach of the systems of the additional system, i.e. at a position located outside of the associated area of coverage of the at least one additional system.

Said first detection and tracking of the approaching aircraft may be used for estimating an expected approach path of the approaching aircraft. For embodiments where the airport stand arrangement is not configured to determine an aircraft type and/or model of the approaching aircraft, i.e. perform an identification step, based on output data from the radar-based system, the output data from the radar-based system may still be used for detecting and tracking the yet unidentified approaching aircraft so as to allow the approaching aircraft to approach the stand to enter into the area of coverage of the at least one additional system. This may allow for the identification step to be carried out by the at least one additional system. However, it is also conceivable that the airport stand arrangement is configured to determine an aircraft type and/or model of the approaching aircraft based on output data from the radar-based system.

According to some embodiments, the airport stand arrangement is further configured to, based on the output data from said one or more additional systems, determine an aircraft type and/or model of the approaching aircraft based on output data from said one or more additional systems.

According to some embodiments, the airport stand arrangement is further configured, in response to the airport stand arrangement being unable to determine the aircraft type and/or model of the approaching aircraft, to provide further pilot maneuvering guidance information instructing the pilot to stop the aircraft.

According to some embodiments, the airport stand arrangement is further configured to, by use of a laser-based system of the one or more additional systems, detect a backscattering signal originating from a volume at the stand area, and in response to the airport stand arrangement being able to detect said backscattering signal:
provide further pilot maneuvering guidance information instructing the pilot to approach the stand,
determine if a signal pattern of the backscattering signal corresponds to at least one pre-defined signal pattern of a library of allowed signal patterns, and
in response to the airport stand arrangement being unable to determine if a signal pattern of the backscattering signal corresponds to the at least one pre-defined signal pattern of the library of allowed signal patterns:
detect and track the approaching aircraft based on output data from the radar-based system, and
in response to the airport stand arrangement being unable to detect said backscattering signal:
provide further pilot maneuvering guidance information instructing the pilot to stop the aircraft.

The further pilot maneuvering guidance information may be provided to the pilot on the display but may alternatively or additionally be provided by other means such as wirelessly using the wireless transmitting means which will be further discussed later.

This may be advantageous as it allows for the airport stand arrangement to allow an approach of the aircraft towards the stand also in situations where the at least one additional system cannot detect and track the approaching aircraft at a distance. By using the radar-based system for detecting and tracking, the aircraft may be allowed to approach the area of coverage of the at least one additional system. This may provide a chance for the at least one additional system to perform an identification. In case this is successful, the aircraft may be allowed to continue approaching the stand. In case it is not successful, the aircraft may be ordered to stop, as safety cannot be guaranteed.

Moreover, from experience and empirical tests, there may be a plurality of known signal patterns of the backscattering signal which are known to at least likely result in a successful identification of the aircraft, if only the aircraft is allowed to come into the area of coverage of the at least one additional system. Such known signal patterns may be stored in a library such as a database. Thus, also in situations where the backscattering signal indicates severe atmospheric scattering, the nature of this scattering may be such that the aircraft can be identified when being close enough. Without the radar-based system, such atmospheric conditions could effectively prevent approach of the aircraft to enter the area of coverage of the at least one additional system, with the result that the identification step may never be tried.

According to some embodiments, the airport stand arrangement further comprises wireless transmitting means, and wherein the airport stand arrangement is configured, in response to said visibility being lower than a second visibility threshold, lower than said first visibility threshold, to wirelessly transmit, using the wireless transmitting means, a signal comprising said pilot maneuvering guidance information to the approaching aircraft.

This may be advantageous as it allows for parking the aircraft at the parking position of the stand even in visibility conditions severe enough for the pilot not being able to view the display. The signal may be received by equipment installed within the aircraft and viewed on a display in the cockpit of the aircraft. The signal may be transmitted using the separate wireless transmitting means. It is, however, also conceivable that the signal is transmitted as a part of the radar signals emitted from the radar-based system.

According to some embodiments, the airport stand arrangement is further configured:
to, as a first determination step, determine whether an aircraft is present or not at said parking position based at least on output data from said one or more additional systems, and
to, in response to a negative determination in said first determination step and as a second determination step, determine whether an aircraft is present or not at said parking position based on output data from said radar-based system;
to transmit an aircraft-present-signal in response to a positive determination in any of said first and second determination steps; and
to transmit an aircraft-not-present-signal in response to a negative determination in both of said first and second determination steps.

The aircraft-present-signal and/or the aircraft-not-present-signal may be transmitted to personnel operating the airport stand arrangement at the stand. Alternatively, the aircraft-present-signal and/or the aircraft-not-present-signal may be transmitted to an external system, such as an airport operational database AODB in communication with the airport stand arrangement.

This may be advantageous as it allows for determining the occupancy of airport stands automatically, also in bad weather conditions. For example, respective airport stand arrangements of a plurality of stands at an airport may be connected to a central system, such as an airport operational database AODB. The AODB may query which stands are occupied at a specific time. It is also conceivable that an airport stand arrangement is configured to determine if an aircraft is leaving, or approaching, a stand.

According to some embodiments, the airport stand arrangement is further configured to determine, as a third determination step, if a passenger bridge is in a predetermined passenger bridge position based on output data from the radar system. In response to a negative determination in the third determination step, the airport stand arrangement may be configured to transmit a passenger-bridge-incorrectly-positioned-signal. In response to a negative determination in the third determination step the airport stand arrangement may be further configured to provide further pilot maneuvering guidance information instructing the pilot to stop the aircraft.

According to some embodiments, the airport stand arrangement is further configured to detect and track other objects within the stand area. The arrangement may be further configured to detect and track said other objects within the stand area in parallel with said detection and tracking of the approaching aircraft during said maneuvering of the approaching aircraft towards the parking position.

Other objects may include any objects other than the approaching aircraft. Typically, the other objects belong to the ground support equipment GSE of the airport. Such equipment includes for example luggage train tractors and dollies, food delivery trucks, refuelers and transport buses. Other examples are chocks and aircraft service stairs. However, the other objects are not limited to ground support equipment. Thus, other objects may for example include a further aircraft accidentally entering the stand area, luggage dropped at the stand area, or even persons. Other objects may be stationary, or moving objects.

According to some embodiments, said arrangement is further configured to predict if the approaching aircraft is on a collision course with any of said other objects, and, in response to a collision course being predicted, to provide further pilot maneuvering guidance information instructing the pilot to stop the aircraft.

According to some embodiments, the airport stand arrangement is configured to, based on at least a speed and direction of each of said other objects and a speed and direction of the approaching aircraft, determine if said other objects are predicted to leave the stand area before the approaching aircraft is predicted to arrive, and, in response to determining that said other objects are not predicted to leave the stand area before the approaching aircraft is predicted to arrive: to provide further pilot maneuvering guidance information instructing the pilot to stop the aircraft.

The airport stand arrangement may be further configured to identify an event at the stand area based on the detection and tracking of said other objects within the stand area. For example, the presence of a food delivery truck (i.e. a catering truck) within the stand area may trigger a "food loading event", which could e.g. involve outputting a signal to airport ground crew and/or the pilot that the food will soon arrive. As another example, aircraft wheel chocks which are manually arranged at each aircraft wheel when the aircraft is at the stop position, may be detected by the airport stand arrangement to trigger an "aircraft secured event". The airport stand arrangement may thus verify that the plane is safely parked and cannot accidentally start to move within the stand area. Moreover, the determination of these events may aid in making docking more efficient as the airport stand arrangement will, by itself, be able to determine what is actually happening at the stand, and from that undertake various actions in order to make remaining tasks more efficient. The event may be one from the list of: arrival of a food delivery truck, arrival of a baggage delivery truck, arrival of stop chocks at a wheel of the aircraft, arrival of a fueling truck, arrival of a passenger bus, arrival of a cleaning company, arrival of water supply, arrival of a waste truck and arrival of a ground power unit.

It may be an advantage if the airport stand arrangement has information of the type and/or model of the aircraft in the stand. The airport stand arrangement may be configured to selectively screen portions of the stand area where a specific object is expected to be found. If, for example, the purpose is verifying the presence of aircraft wheel chocks at the rear wheels, the airport stand arrangement may determine the expected location of the rear wheels based on the aircraft model and/or type combined with a general position information for the aircraft, such as the location of the nose, or front wheel of the aircraft. Yet another example is that the airport stand arrangement may determine the expected location of the food delivery truck based on the aircraft model and/or type combined with a general position information for the aircraft, such as the location of the nose, or front wheel of the aircraft.

According to some embodiments, the airport stand arrangement is configured to identify an event at the stand area based on selectively detecting and tracking an object of said other objects at a specific location at the stand area, wherein said specific location is determined based on an aircraft type and/or model of the aircraft in the stand and output data from the combined system.

According to some embodiments, the one or more additional systems include at least one imaging system, and wherein the airport stand arrangement is configured to:
detect and track an object of said other objects based on output data from the imaging system, and
verify the existence of said detected and tracked object based on output data from a further system of the one or more additional systems and/or output data from the radar-based system.

According to some embodiments, said detection and tracking of said other objects is based on output data from the radar-based system, and wherein said detection and tracking of the approaching aircraft is based on output data from said one or more additional systems.

This may be advantageous as it allows for automatically monitoring the stand area thus reducing the risk of accidents at the stand. Monitoring the stand area is sometimes referred to as an apron check. Typically, in prior art the stand area is monitored manually, or by additional surveillance systems not part of an airport stand arrangement. Neither of these solutions provide a possibility of automatically making decisions and informing the pilot thereof. The disclosed airport stand arrangement may utilize the systems of the combined system to detect and track not only the approaching aircraft, but also other objects within the stand area. The detection and tracking of the other objects may occur independently of the detection and tracking of the approaching aircraft. In other words, the detection and tracking of other objects may occur before the approaching aircraft has entered the stand area, and/or during the process of parking the aircraft at the parking position, and/or during the time when the aircraft is parked at the stand, and/or during the process of the aircraft departing from the parking position at the stand area etc.

According to a second aspect there is provided a method for detecting and tracking an aircraft within a stand area when said aircraft is approaching a stand within the stand area for parking at a parking position therein, wherein said detection and tracking is based on output data from a radar-based system; and one or more additional systems selected from laser-based systems and imaging systems, the method comprising:

determining a visibility based on output data from one or more of said one or more additional systems, in response to said visibility being lower than a first visibility threshold:

detecting and tracking the approaching aircraft based on output data from said radar based system.

According to some embodiments the method further comprises:

in response to said visibility being higher than the first visibility threshold:

detecting and tracking the approaching aircraft based on output data from one or more of said one or more additional systems.

According to some embodiments, the method further comprises:

providing, based on said detection and tracking of the approaching aircraft, pilot maneuvering guidance information on a display for aiding a pilot of the approaching aircraft in maneuvering the aircraft towards said parking position.

According to some embodiments, the method further comprises:

in response to said visibility being lower than a second visibility threshold, lower than said first visibility threshold:

wirelessly transmitting a signal comprising said pilot maneuvering guidance information to the approaching aircraft.

According to a third aspect there is provided a computer-readable medium comprising computer code instructions which when executed by a device having processing capability are adapted to perform the method according to the second aspect.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The invention will by way of example be described in more detail with reference to the appended schematic drawings, which shows presently preferred embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
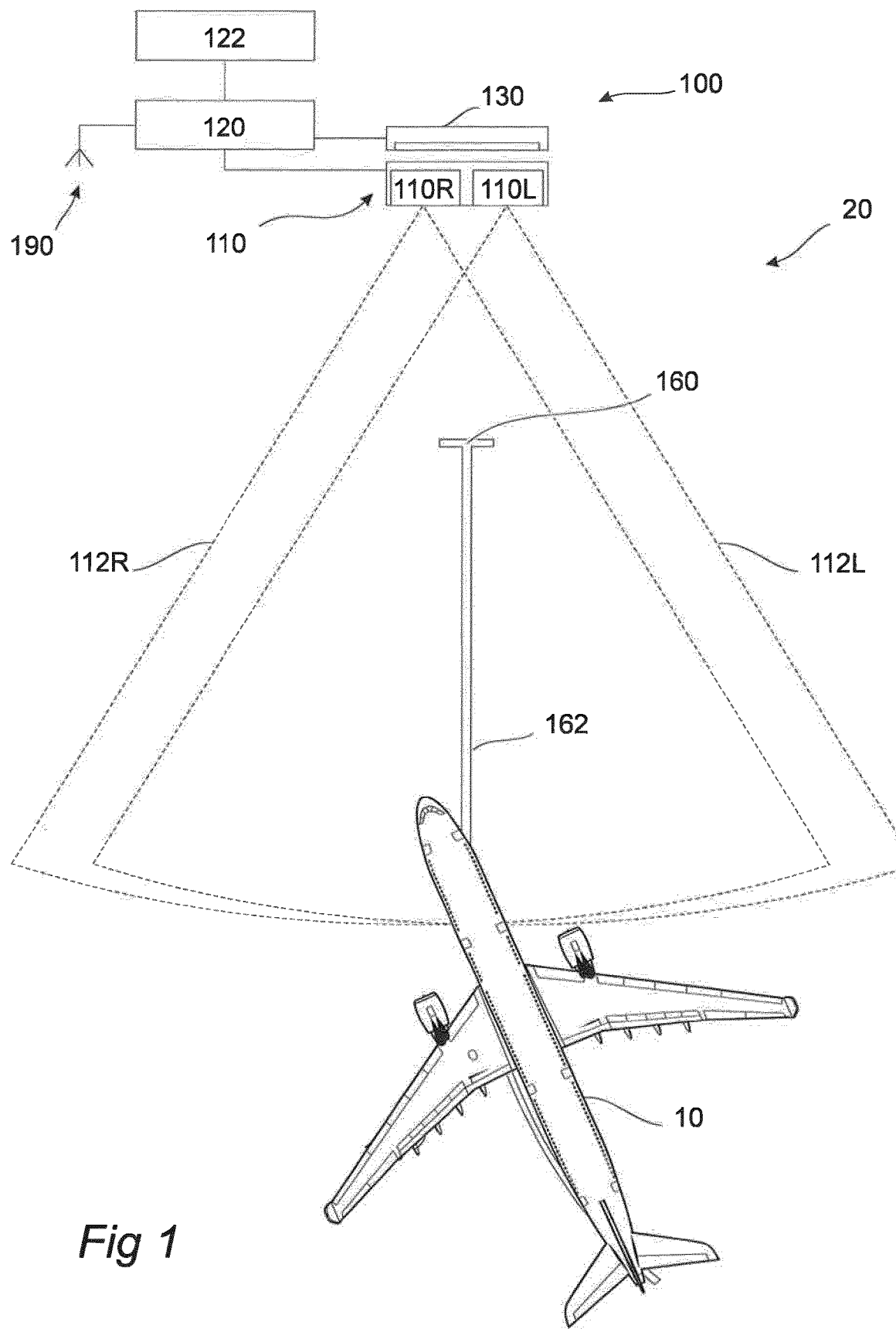
FIG. 1 is a top view of the airport stand arrangement at a stand area according to an embodiment of the present disclosure.

FIG. 1 shows an airport stand arrangement 100 according to an example embodiment. The airport stand arrangement comprises a radar-based system 110R, and one or more additional systems selected from laser-based systems and imaging systems. As can be seen in FIG. 1, the one or more additional systems are here selected from laser-based systems only. Specifically, the one or more additional systems is here a laser-based system 110L.

The radar-based system 110R is a remote sensing detection system based on microwave electromagnetic radiation. Such systems emit continuous or pulsed radar signals towards a target and capture and detect radar pulses backscattered from the target. The radar-based system 110R may comprise a radar sensor of semi-conductor type. For example, the radar sensor may be of the kind used within the automotive industry. The radar sensor may operate at 77 GHz. The radar-based system provides output data pertaining to a radar-based system coverage 112R at the stand area 20.

The laser-based system 110L is a remote sensing detection system based on optical electromagnetic radiation. Such systems emit continuous or pulsed laser radiation towards a target and capture and detect laser radiation backscattered from the target. The laser-based system 110L may comprise beam deflecting means for providing scanning capabilities. Such beam deflecting means may be e.g. a scanning mirror arrangement. The laser-based system 110L provides output data pertaining to a laser-based system coverage 112L at the stand area 20.

The radar-based system 110R and the one or more additional systems together form a combined system 110. As illustrated in FIG. 1, the combined system 110 is disposed at the display and arranged so as to emit laser radiation and radar radiation in a direction along the lead-in line 162 towards the approaching aircraft 10.

The airport stand arrangement 100 further comprises a display 130 for providing pilot maneuvering guidance information to a pilot of the approaching aircraft 10. The display 130 is here mounted on the wall of the terminal building at a vertical position where the display 130 is in clear view of the pilot of the approaching aircraft 10.

The airport stand arrangement 100 further comprises a control unit 120 operatively connected to the combined system 110 and the display 130. The control unit 120 is further operatively connected to a database 122. The database 122 may be an airport operational database AODB comprising flight plans of arriving and departing aircrafts. This way, the control unit 120 may access information pertaining to the type of aircraft which will be approaching the stand area 20. The control unit 120 may also be in direct communication with the approaching aircraft 10, for example via ADS-B. In such a case, the control unit may receive the type of aircraft directly from the aircraft 10 instead of via the database 122.

The functionality of the airport stand arrangement 100 will now be described with reference to FIG. 4.

The airport stand arrangement 100 is configured to determine S102 output data pertaining to an appearance of the stand area 20. Such a determination may be carried out using one or more from the combined systems. However, one preferred functionality of the airport stand arrangement 100 is that the output data is determined S102 using one or more from the additional systems (in the example: the laser based system S110L). The laser-based system 110L is a remote sensing detection system based on optical electromagnetic radiation. Such systems emit continuous or pulsed laser radiation towards a target and capture and detect laser radiation backscattered from the target. The laser-based system 110L comprises beam deflecting means for providing scanning capabilities. Such beam deflecting means may be e.g. a scanning mirror arrangement.

The airport stand arrangement 100 is further configured to determine S104 a visibility V based on output data from one or more of said additional systems (in the example: the laser-based system 110L). As is known, fog or precipitation affects visibility mainly in that incident electromagnetic radiation is scattered by the droplets in the atmosphere. During the scattering process, the illuminated droplets reemit some fraction of the incident electromagnetic radiation in all directions. The droplets then act as point sources of the reemitted energy. Some portion of the incident electromagnetic radiation is scattered backwards towards the radiation source, dependent on the relation between the droplet size and the radiation wavelength. The relation between visibility and scattered electromagnetic radiation is widely described in the literature as discussed in more detail for example in patent application WO2007108726A9.

The airport stand arrangement 100 is configured to compare S106 said visibility with a first visibility threshold V1. If the determined visibility V is found to be lower than a first visibility threshold V1, the airport stand arrangement 100 is configured to detect and track S110 the approaching aircraft 10 based on output data from the radar based system 110R. Thus, if the weather conditions are determined to be severe enough for preventing accurate optical remote sensing using the laser-based system 110R, the radar-based system 110R may instead be used for the detection and tracking of the approaching aircraft 10. Alternatively, if the determined visibility V is found to be higher than the first visibility threshold V1, the airport stand arrangement 100 is configured to detect and track S108 the approaching aircraft 10 based on output data from the one or more additional systems (in the example: the laser-based system 110R).

Independent on which system is used to provide output data for detection and tracking, the airport stand arrangement 100 performs similar tasks. As specified above, the airport stand arrangement 100 is configured, based on output data from said combined system 110, to detect and track S108,S110 the aircraft 10 within a stand area 20 when said aircraft 10 is approaching a stand within the stand area 20 for parking at a parking position 160 therein. Said detection and tracking of the aircraft 10 is based on output data from the combined system 110. Thus, the radar-based system 110R and/or the one or more additional systems (in the example: the laser-based system 110L) outputs data pertaining to objects at the stand area 20 to the controller 120. The controller 120 receives said output data and performs a data analysis of it so as to determine tracking data of the aircraft 10, said tracking data including the position of the aircraft 10, the velocity of the aircraft 10 etc. Moreover, the controller 120 may also perform a data analysis of the received output data to determine the dimensions of the aircraft 10. Said dimensions may be compared to dimensions of aircraft models stored locally in the airport stand arrangement, or in the AODB 122, to establish an aircraft type and model of the aircraft 10. Alternatively, or additionally, the aircraft type and model may be determined by other means. For example, if the aircraft 10 is communicating with an airport surveillance system using the ADS-B standard, the airport surveillance system may receive the identity and position of the aircraft 10 transmitted to the airport surveillance system directly from the aircraft using an ADS-B transponder of the aircraft 10. In such a case, the aircraft model may be accessed from the AODB 122 by comparing the received identity of the aircraft with known aircrafts stored within a flight plan of the AODB 122. The aircraft stand arrangement 100 may then receive the aircraft type and/or dimensions of the aircraft type from the AODB 122. The aircraft stand arrangement 100 may then compare the dimensions of the aircraft type with dimensions of the aircraft inferred from an analysis of the output data received from the combined system 110. Thus, the aircraft type determined based on the direct communication with the aircraft using the ADS-B system may be confirmed by the aircraft stand arrangement 100.

The airport stand arrangement 100 is further configured, based on said detection and tracking of the approaching aircraft 10, to provide pilot maneuvering guidance information for aiding the pilot of the approaching aircraft 10 in maneuvering the aircraft 10 towards the parking position 160. The pilot maneuvering guidance information is determined by the control unit 120 by analyzing the output data received from the combined system 110.

Figure 4:
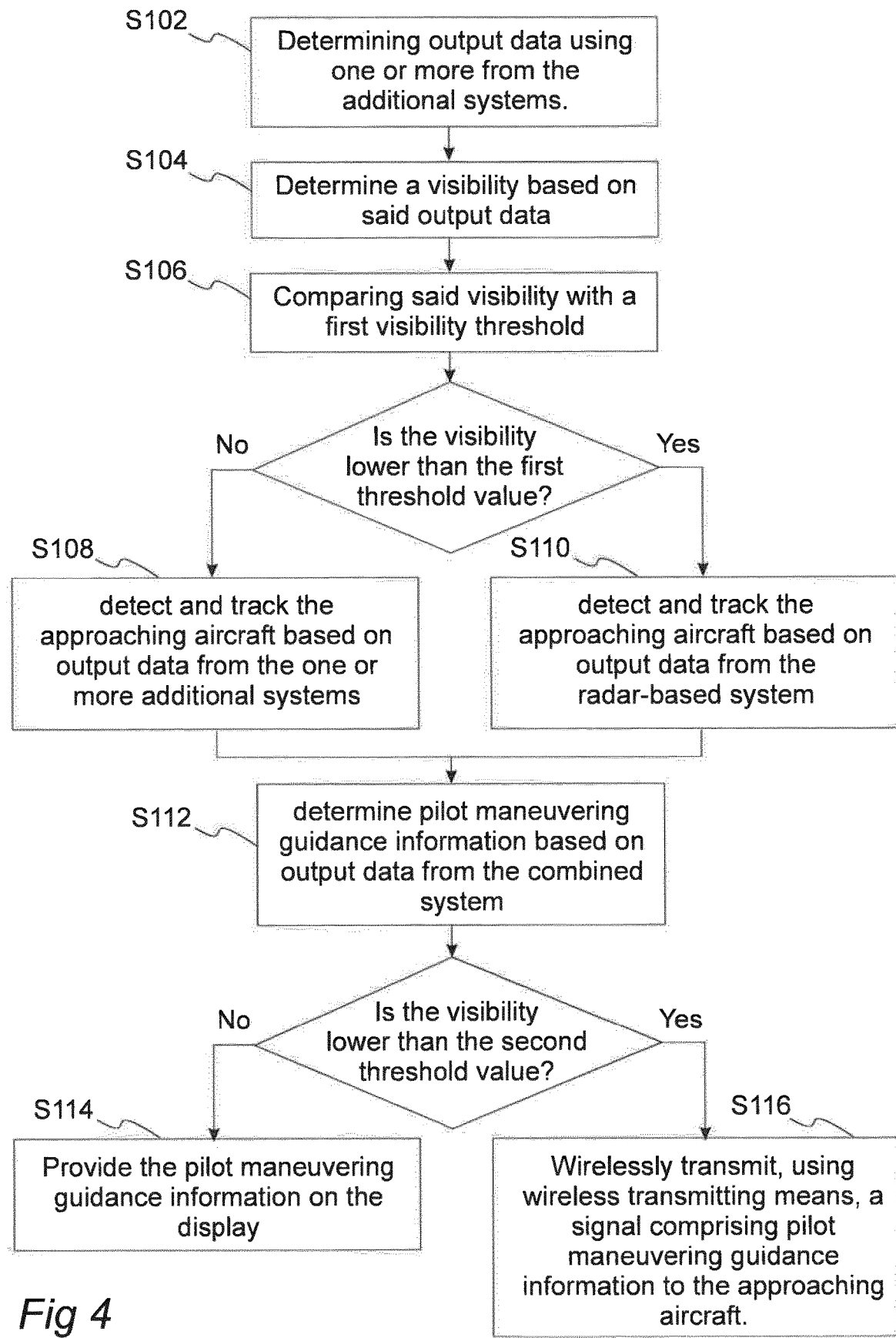
FIG. 4 is a flow chart illustrating a functionality of the airport stand arrangement according to embodiments of the present disclosure.

As illustrated in FIG. 4, the airport stand arrangement 100 may, after having determined the pilot maneuvering guidance information, act differently depending on the determined visibility V. Thus, in a second determination step D113, the visibility V is compared to a second visibility threshold V2, lower than the first visibility threshold V1. If the determined visibility V is found to be lower than the second visibility threshold V2, the airport stand arrangement 100 is configured to wirelessly transmit S116 a signal comprising said pilot maneuvering guidance information to the approaching aircraft 10. For the purpose, the airport stand arrangement 100 comprises wireless transmitting means 190. The wireless transmitting means 190 is operatively connected to the control unit 120. It is, however, also conceivable that the signal is wirelessly transmitted as a part of the radar signals emitted from the radar-based system 110R. The signal may be received by equipment installed within the aircraft 10 and viewed on a display in the cockpit of the aircraft. This allows for the pilot to maneuver the aircraft 10 to the parking position 160 also without the guidance provided by the display 130 of the arrangement 100. For example, in extreme weather situations, such as heavy smog, the pilot may maneuver the aircraft 10 to the parking position 160 without having to look through the cockpit windows.

The airport stand arrangement 100 is further configured to detect and track the approaching aircraft 10 based on combined output data from said radar-based system 110R, on the one hand, and from the one or more additional systems (in the example: the laser-based system 110L), on the other hand. This functionality allows for increasing the overall sensitivity and accuracy of detection and tracking within the stand area 20. In the example embodiment 100, the laser-based system 110L may provide higher spatial resolution in good weather conditions, whereas the radar system may provide higher sensitivity for specific materials such as composite materials. The airport stand arrangement 100 may therefore in the control unit 120 receive respective output data from the radar-based system 110R and the laser-based system 110L, and analyze said respective output data together. An algorithm may run a pre-processing sub-algorithm to determine corresponding spatial regions of the output data (e.g. pixel-to-pixel matching), analyze each output data within said corresponding regions so as to determine which of the respective output data that contains the most promising data for detecting and tracking in that corresponding region. In case the corresponding region contains data pertaining from the nose of a composite-material bodied aircraft, the output data from the radar-based system may be most promising. In case the corresponding region contains data pertaining from the metallic front body frame of an aircraft, the output data from the laser-based system may be most promising, and so on.

According to one example embodiment, the airport stand arrangement is configured to detect and track the approaching aircraft based on a spatially resolved weighted average of the combined output data. The weighted average is determined based on statistical weights for the radar system and the one or more additional systems, respectively. The weighted average may thus be a matrix of average data values, wherein each average data value pertains to a specific spatial location on the stand area and is calculated as a sum of weighted data values (of an associated output data) pertaining to the same spatial location but detected using the radar system, and the one or more additional systems, respectively. The data values are individually weighted before averaging is carried out. The individual weights may be numbers in the range 0 to 1. In the example embodiment, the airport stand arrangement is configured to determine the statistical weights based on associated output data from the respective systems of the combined system. In other words, the output data may first be analyzed to determine appropriate statistical weights, whereby the averaging may be carried out using said determined statistical weights. In the example embodiment, the airport stand arrangement is configured to determine a visibility based on output data from said one or more additional systems and determine the statistical weights based on the visibility. In case the visibility is found to be low (indicating bad weather conditions), the statistical weights for the one or more additional systems may be set to 0 or slightly higher than zero, such as e.g. in the range 0-0.2, whereas the statistical weights for the radar system may be set to 1. In case the visibility is found to be reduced (indicating some degree of bad weather conditions), the statistical weights for the one or more additional systems may be set to e.g. 0.5 and the statistical weights for the radar system may be set to e.g. 0.5. This is however only an example, and as appreciated by the person skilled in the art, many other numbers or ranges of numbers may be determined based on the determined visibility.

Figure 2:
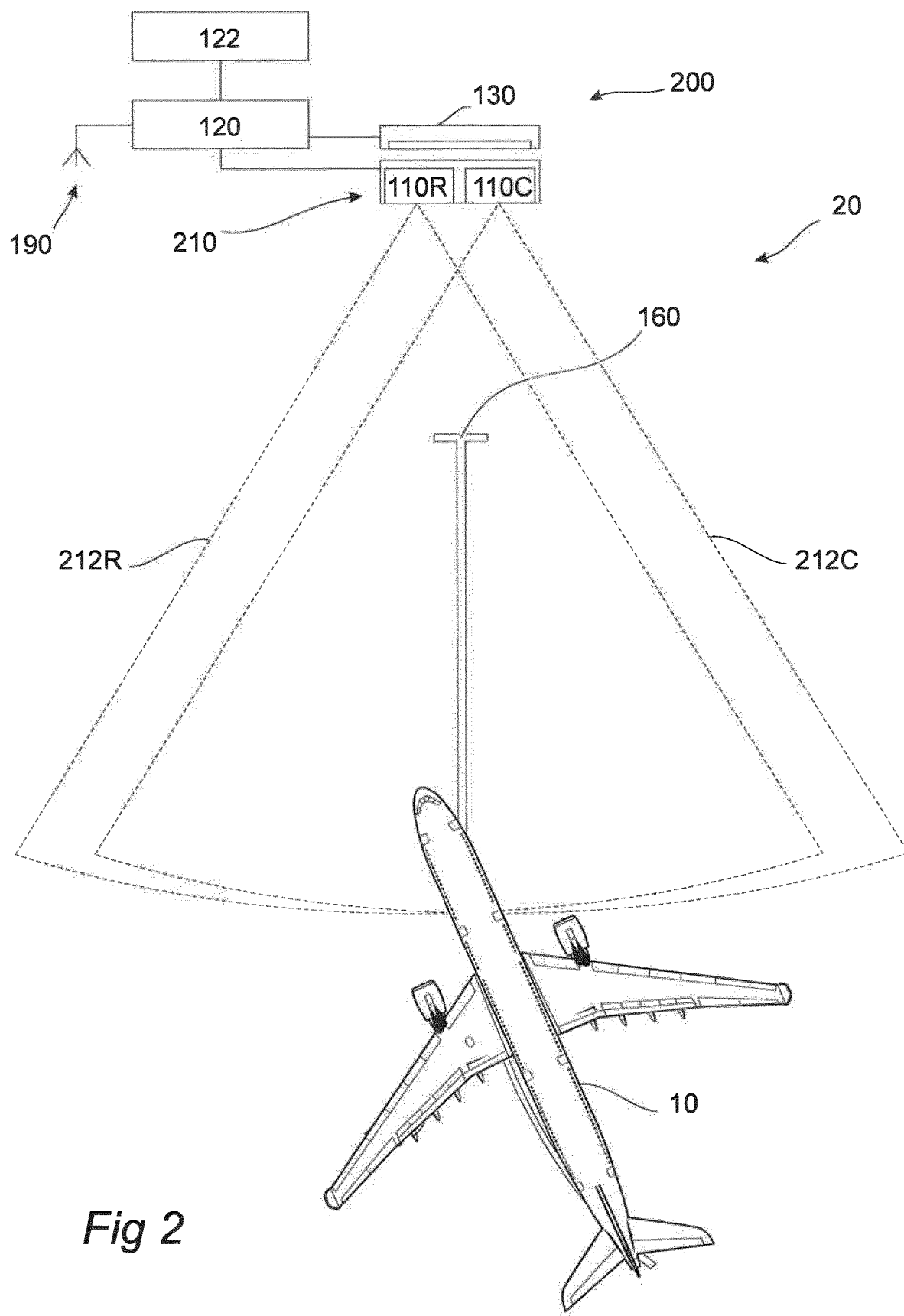
FIG. 2 is a top view of the airport stand arrangement at a stand area according to another embodiment of the present disclosure.

FIG. 2 shows an airport stand arrangement 200 according to another example embodiment. The airport stand arrangement 200 is similar to the airport stand arrangement 100 already described in detail, herein, except from that the one or more additional systems are here selected from imaging systems only. Specifically, the one or more additional systems is here an imaging system 110C. The imaging system 110C comprises a camera sensitive to optical or infrared radiation. The imaging system 110C is used to capture the emission of natural radiation from the target. The imaging system 110C provides output data pertaining to an imaging system coverage 112C at the stand area 20.

Figure 3:
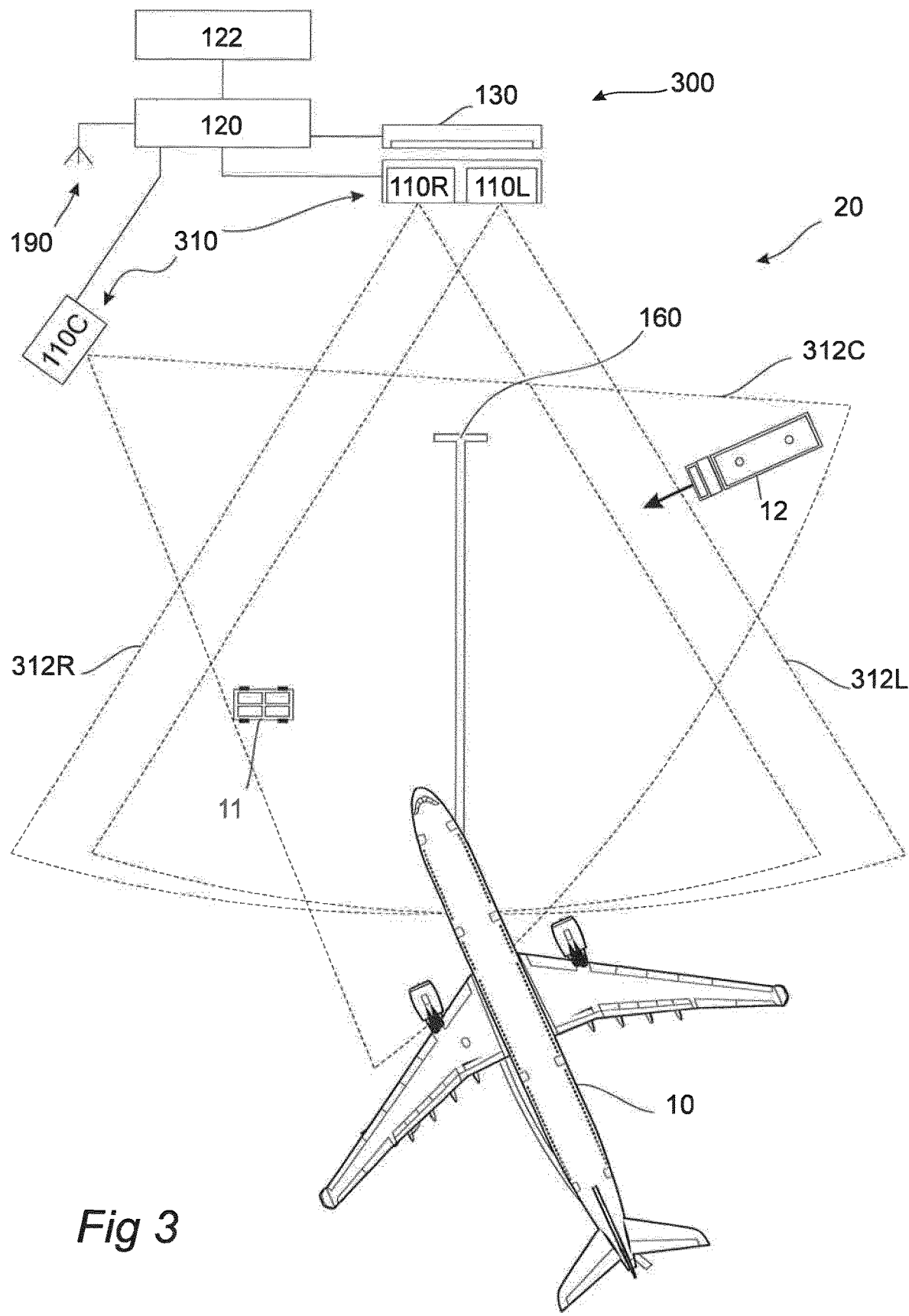
FIG. 3 is a top view of the airport stand arrangement at a stand area according to yet another embodiment of the present disclosure.

FIG. 3 shows an airport stand arrangement 300 according to another example embodiment. The airport stand arrangement 300 is similar to the airport stand arrangement 100 already described in detail, herein, except from that the one or more additional systems comprise laser-based system 110L and image-based system 110C. Thus, the combined system 310 includes three different systems. The airport stand arrangement 300 also differs from the airport stand arrangement 100 in that the imaging system 110C is distanced from the radar-based system 110R and the laser-based system 110L. This allows for the arrangement 300 to, at each position in time, detect the approaching aircraft 10 using different collection angles. Specifically, the camera-based system 110C has an area of coverage 312C arranged to complement the areas of coverage 312L and 312R of the radar-based system 110R and the laser-based system 110L, respectively.

The airport stand arrangement 300 is further configured to detect and track other objects within the stand area 20. Two other objects are illustrated in FIG. 3, namely a luggage dolly 11, and a food delivery truck 12. As also illustrated in FIG. 3, the luggage dolly 11 is standing still, whereas the food delivery truck 12 is approaching the stand area from the right. This allows for continuously, and automatically, monitoring the stand area 20 for potential objects which may be involved in causing accidents at the stand.

Typically, the most severe such accidents involve the accidental collision of the approaching aircraft 10 with one or more from said other objects. Thus, it is of interest to detect and track said other objects during the approach of the aircraft 10. The arrangement 300 is thus configured to detect and track the other objects 11,12 within the stand area 20 in parallel with said detection and tracking of the approaching aircraft 10 during the maneuvering of the approaching aircraft 10 towards the parking position 160. This may be achieved in different ways. By way of example, detection and tracking of the aircraft may be based on output data from the laser-based system 110L, whereas the detection and tracking of other objects may be based on output data from the radar-based system 110R. It is however, also conceivable that detection and tracking of the aircraft and of the other objects is based on output data from more than one system of the combined system 310.

The arrangement 300 is further configured to predict if the approaching aircraft 10 is on a collision course with any of said other objects 11,12, and, in response to a collision course being predicted, to provide further pilot maneuvering guidance information instructing the pilot to stop the aircraft 10. The prediction may be achieved using tools readily available to the skilled person. For example, the evaluation may be performed based on the use of a Kalman filter acting as a time filter to combine measurements (observations) and a model of the dynamics of the detected obstacles. The Kalman filter may be used to combine a set of measurements over time to create the most likely positions or trajectories of the obstacles.

The airport stand arrangement 300 is further configured to, based on at least a speed and direction of each of said other objects 11,12 and a speed and direction of the approaching aircraft 10, determine if said other objects 11,12 are predicted to leave the stand area 20 before the approaching aircraft 10 is predicted to arrive, and, in response to determining that said other objects 11,12 are not predicted to leave the stand area 20 before the approaching aircraft 10 is predicted to arrive: to provide further pilot maneuvering guidance information instructing the pilot to stop the aircraft 10. The further pilot maneuvering guidance information may be provided to the pilot on the display but may alternatively or additionally be provided by other means such as wirelessly using the wireless transmitting means.

The airport stand arrangement 300 is further configured to identify an event at the stand area 20 based on the detection and tracking of said other objects 11,12 within the stand area 20. The event is identified based on selectively detecting and tracking an object of said other objects 11,12 at a specific location at the stand area 20, wherein said specific location is determined based on an aircraft type and/or model of the aircraft and output data from the combined system 310. The event may be one from the list of: arrival of a food delivery truck, arrival of a baggage delivery truck, arrival of stop chocks at a wheel of the aircraft, arrival of a fueling truck, arrival of a passenger bus, arrival of a cleaning company, arrival of water supply, arrival of a waste truck and arrival of a ground power unit.

The airport stand arrangement 300 is further configured to detect and track an object of said other objects 11,12 based on output data from the imaging system 110C, and verify the existence of said detected and tracked object based on output data from a further system 110L of the one or more additional systems and/or output data from the radar-based system 110R.

Figure 5:
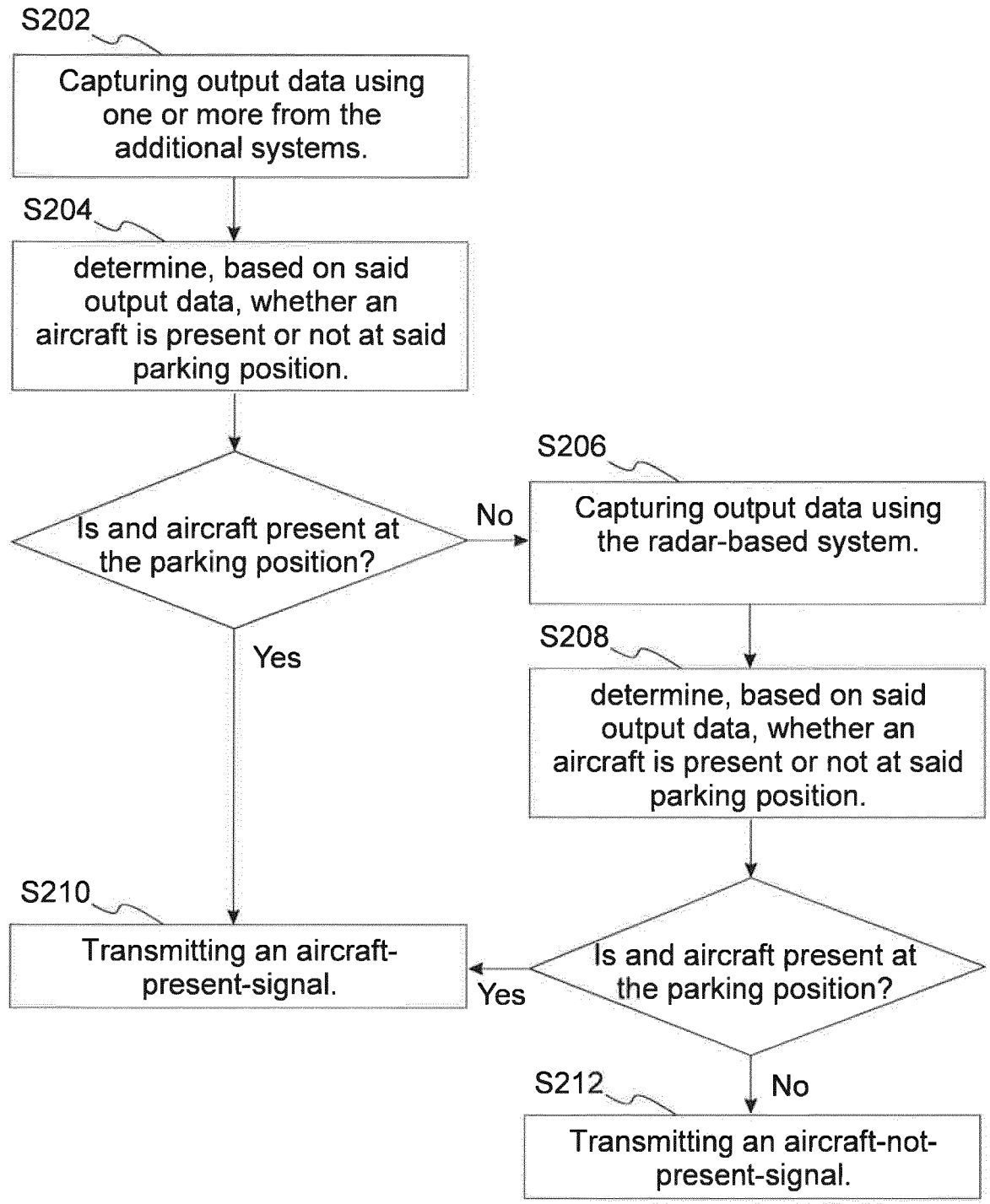
FIG. 5 is a flow chart illustrating another functionality of the airport stand arrangement according to embodiments of the present disclosure.

FIG. 5 shows a further functionality of the airport stand arrangement 300 of the disclosure. It is of importance for airport overall control to keep track of which gates are available and which are occupied. For this purpose, the airport stand arrangement 300 may use its detection and tracking capability to continuously, or at a request, inform stand personnel and/or airport control of the occupancy status of the stand. Thus, the airport stand arrangement 300 is configured to determine S202 output data pertaining to the stand area 20 using one or more from the additional systems (for example the laser-based system 110L). The airport stand arrangement 300 is then configured to, as a first determination step, determine S204 whether an aircraft is present or not at said parking position based at least on output data from said one or more additional systems (for example the laser-based system 110L). In some situations, for example during good weather conditions, this may be enough. If an aircraft is indeed present within the gate area 20, the aircraft will also be successfully detected by the arrangement 300. However, in some situations, for example during bad weather conditions, characteristics of the aircraft may not be clearly present in the output data of the one or more additional systems. In such a case, the first determination step may result in that the stand is detected to be empty, while it in reality is not—a situation which may result in serious accidents. To mitigate this problem, the airport stand arrangement 300 is further configured to, in response to a negative determination in the first determination step, determine S206 output data pertaining to the stand area 20 using radar-based system 110R, and, as a second determination step, to determine S208 whether an aircraft is present or not at said parking position based on output data from the radar-based system 110R. Thus, in case an aircraft cannot be detected by the one or more additional systems, the radar-based system is used so as to provide a basis for a second opinion in the matter. Finally, the airport stand arrangement 300 is configured to transmit S210 an aircraft-present-signal in response to a positive determination in any of said first and second determination steps, and to transmit S212 an aircraft-not-present-signal in response to a negative determination in both of said first and second determination steps. Thus, in case the first determination step results in a detection of the aircraft in the stand area 20, the second determination step is not needed. It is however conceivable to use both determination steps at all times to further increase the accuracy of determination. For example, combined output data from two or more systems of the combined system may be used, as discussed hereinabove.

Figure 6:
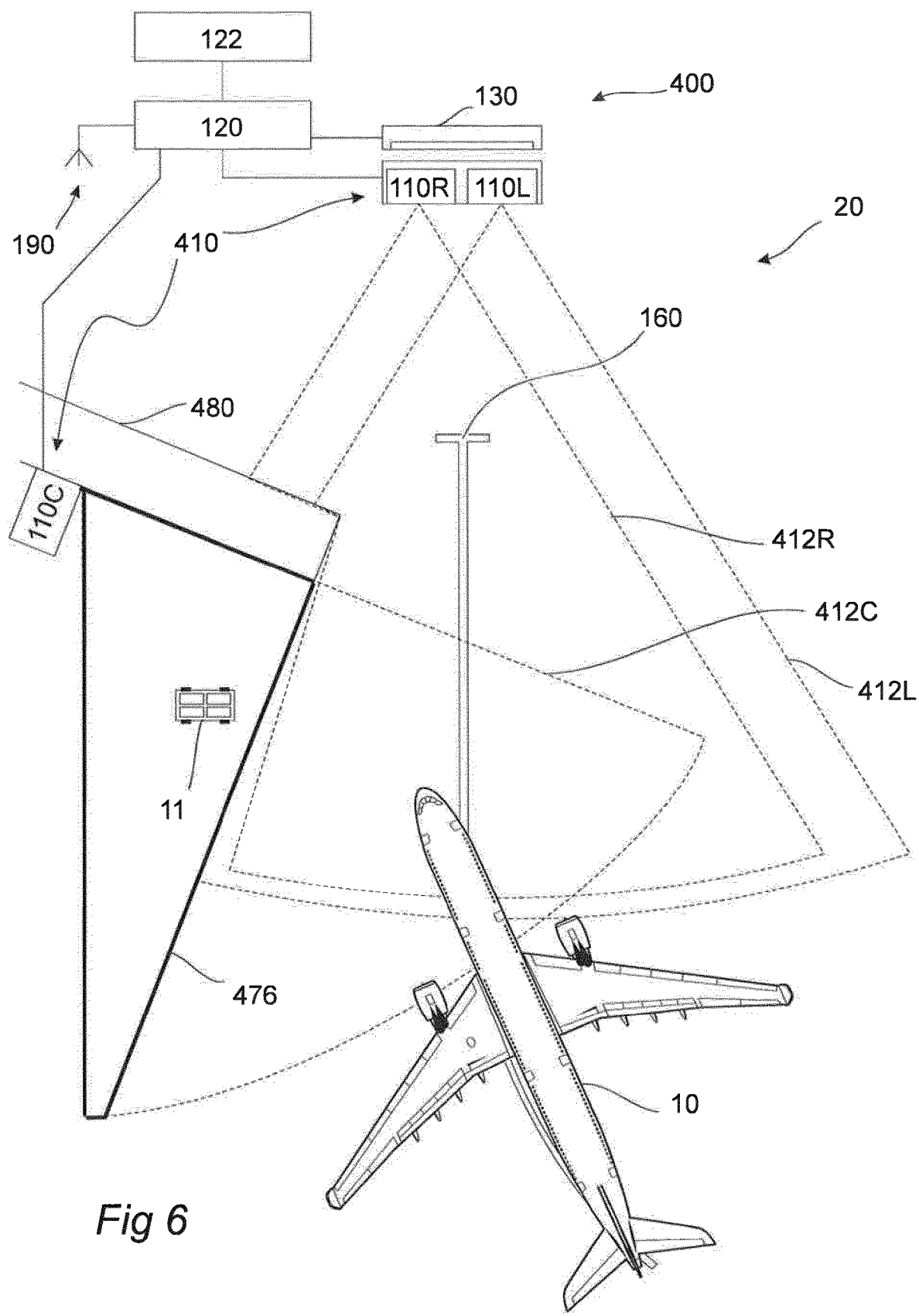
FIG. 6 is a top view of an airport stand arrangement at a stand area according to yet another embodiment of the present disclosure.

FIG. 6 shows an airport stand arrangement 400 according to another example embodiment. The airport stand arrangement 400 is similar to the airport stand arrangement 300 described previously. However, for the airport stand arrangement 400, at least one system (in the example: the imaging system 110C) of the combined system 410 is arranged such that an associated area of coverage 412C thereof extends over a portion 476 of the stand area 20 which portion 476 at least partly overlaps with a part of the stand area 20 being blocked, by a blocking structure 480 in the stand area 20, from detection and tracking using said remaining systems 110L, 110R of the combined system 410. Thus, the area of coverage 412R of the radar-based system 110R and the area of coverage 412L or the laser-based system 110L does not overlap with the portion 476. In the example, the blocking structure 480 is a passenger bridge. The at least one system is arranged on, or at, the blocking structure 480. As illustrated in FIG. 6, a luggage dolly 11 is located in the portion 476 and may therefore be detected and tracked using the airport stand arrangement 400 by means of the imaging system 110C even if the radar-based-system 110R and the laser-based system 110L are not able to detect or track the luggage dolly 11 as a result from the passenger bridge 480 obstructing the view.

Figure 7:
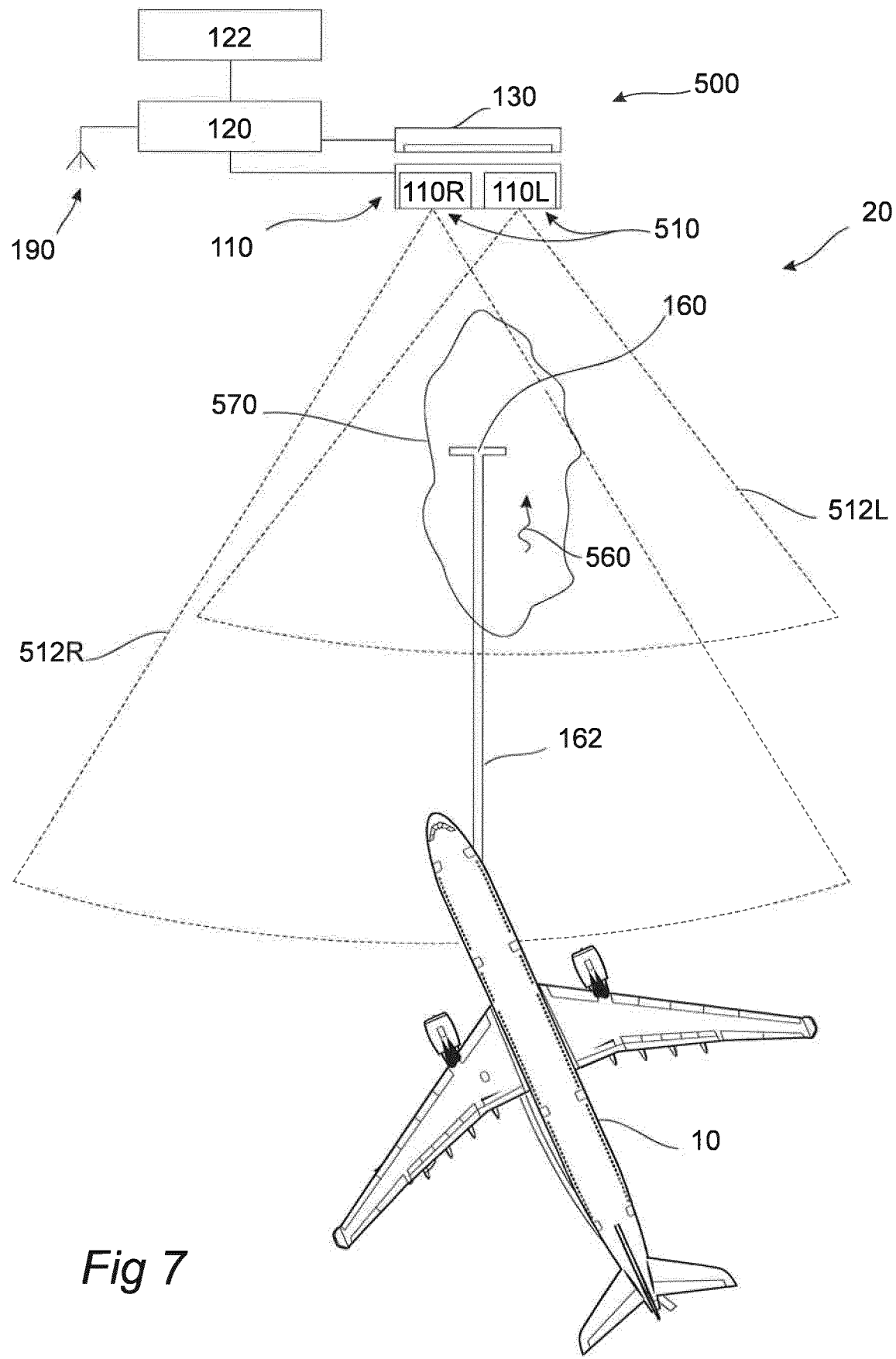
FIG. 7 is a top view of an airport stand arrangement at a stand area according to yet another embodiment of the present disclosure.

FIG. 7 shows an airport stand arrangement 500 according to another example embodiment. The airport stand arrangement 500 comprises a radar-based system 110R and a laser-based system 110L. The radar-based system 110R and a laser-based system 110L together form a combined system 510. As can be seen in FIG. 7, the area of coverage 512R of the radar-based system 110R extends further out from the parking position 160 than the associated area of coverage 512L of the laser-based system 110L as defined along a direction along which the approaching aircraft 10 is expected to enter the stand area 20.

This may be a result from design considerations but may alternatively or additionally be a result from weather conditions, resulting in e.g. presence of fog in the stand area 20, since the radar-based system 110R is less influenced by such weather conditions than the laser-based system 110L, effectively resulting in different range of the two systems.

Figure 8A:
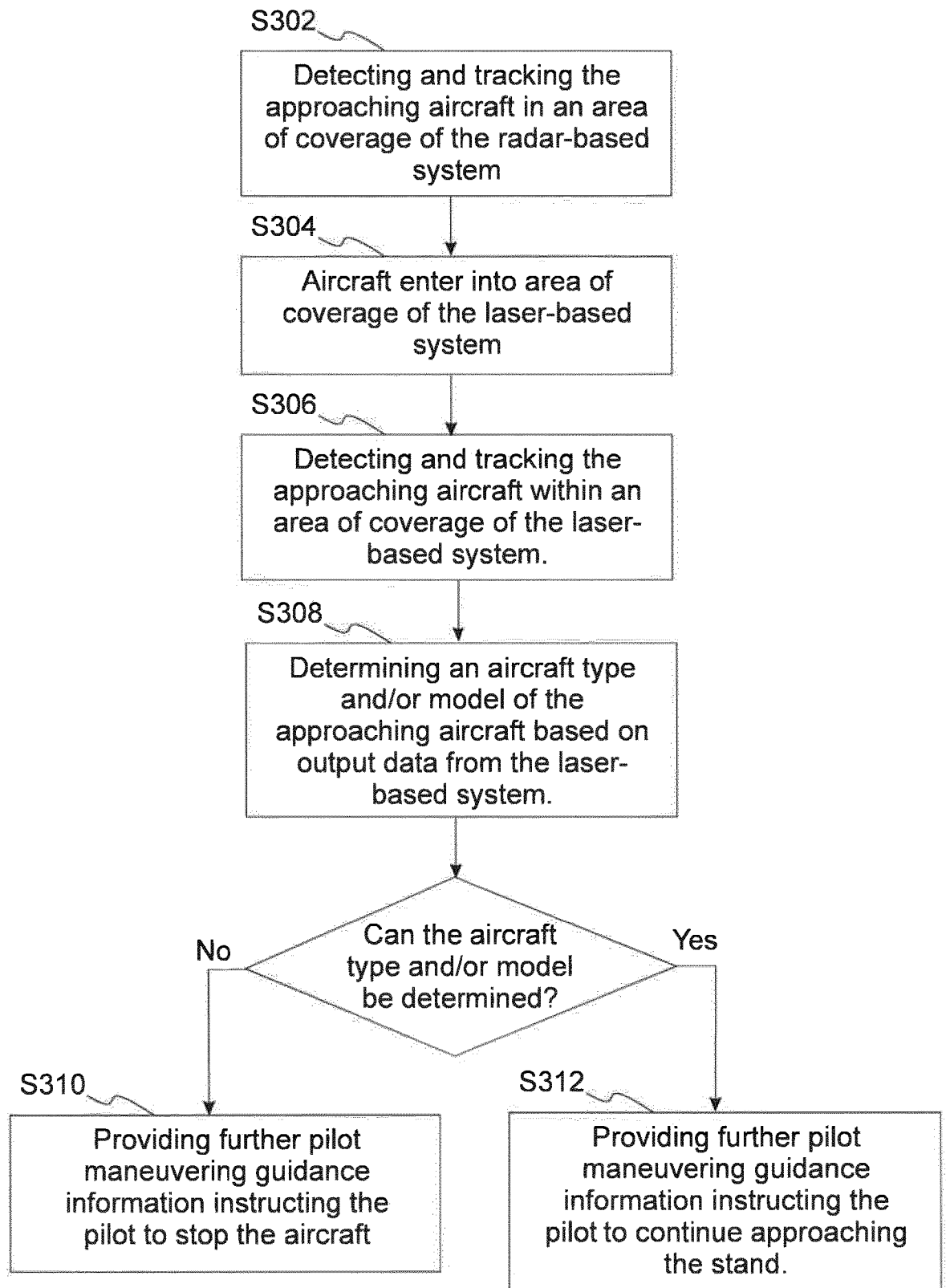
FIG. 8A is a flow chart illustrating a functionality of the airport stand arrangement according to embodiments of the present disclosure.

FIG. 8A shows a functionality of the airport stand arrangement 500 illustrated in FIG. 7. The airport stand arrangement 500 is configured to, based on output data from the radar-based system 110R, detect and track S302 the approaching aircraft 10 in an area of coverage 512R of the radar-based system 110R for allowing the approaching aircraft 10 to approach the stand and enter S304 into an area of coverage 512L of the laser-based system 110L of the one or more additional systems 510. The airport stand arrangement 500 is further configured to, based on output data from said laser-based system 110L, detect and track S306 the approaching aircraft 10 within an associated area of coverage 512L of the laser-based system 110L. The airport stand arrangement 500 is further configured to, based on the output data from the laser-based system 110L, determine S308 an aircraft type and/or model of the approaching aircraft 10 based on said output data from the laser-based system 110L. The airport stand arrangement 500 is further configured, in response to the airport stand arrangement 500 being unable to determine the aircraft type and/or model of the approaching aircraft 10, to provide S310 further pilot maneuvering guidance information instructing the pilot to stop the aircraft 10. In the alternative case of the airport stand arrangement 500 being able to determine the aircraft type and/or model of the approaching aircraft 10, the airport stand arrangement 500 is configured to provide S312 further pilot maneuvering guidance information instructing the pilot to continue approaching the stand.

The disclosed functionality allows for guiding the aircraft 10 closer to the stand 20 so as to allow the laser-based system 110L to determine the aircraft type and/or model. Without the radar-based system 110R, the airport stand arrangement 500 would not be able to see the aircraft 10 when it is located outside of the area of coverage 512L of the laser-based system 110L. However, once the aircraft 10 is successfully guided into the area of coverage 512L of the laser-based system 110L, the laser-based system 110L may very well be able to determine the aircraft type and/or model, as the signal quality may be sufficient for this purpose within the area of coverage 512L of the laser-based system 110L.

Figure 8B:
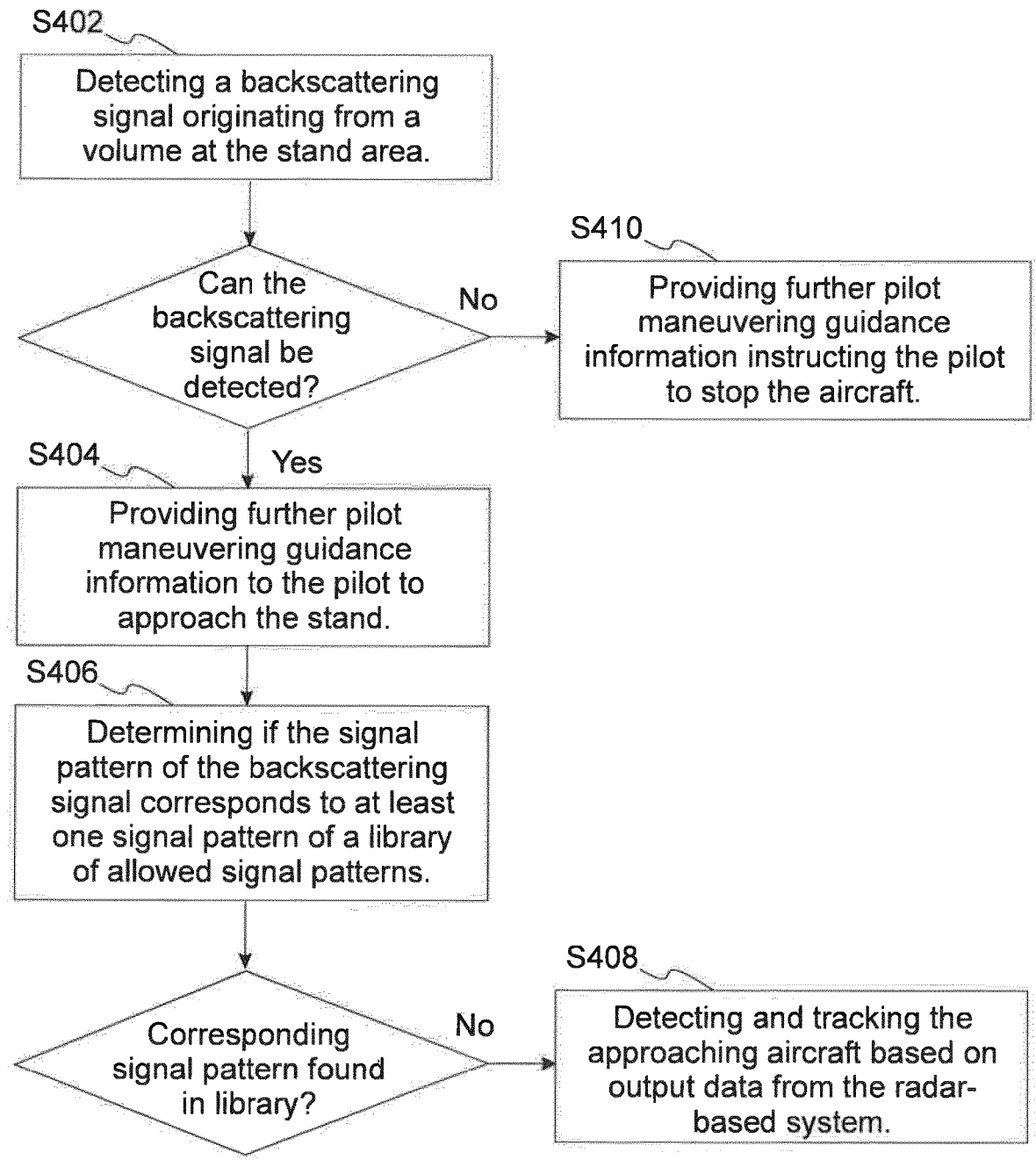
FIG. 8B is a flow chart illustrating a functionality of the airport stand arrangement according to embodiments of the present disclosure.

FIG. 8B shows another functionality of the airport stand arrangement 500 of the disclosure. The airport stand arrangement 500 is configured to, by use of the laser-based system 110L, detect S410 a backscattering signal 560 originating from a volume 570 at the stand area 20, and in response to the airport stand arrangement 500 being able to detect said backscattering signal 560: provide S404 further pilot maneuvering guidance information instructing the pilot to approach the stand, determine S406 if a signal pattern of the backscattering signals 560 corresponds to at least one pre-defined signal pattern of a library of allowed signal patterns, and in response to the airport stand arrangement 500 being unable to determine if a signal pattern of the backscattering signal 560 corresponds to the at least one pre-defined signal pattern of the library of allowed signal patterns: detect and track S408 the approaching aircraft 10 based on output data from the radar-based system 110R, and in response to the airport stand arrangement 500 being unable to detect said backscattering signals 560: provide S410 further pilot maneuvering guidance information instructing the pilot to stop the aircraft 10. In the alternative situation where the airport stand arrangement 500 is able to determine a signal pattern of the backscattering signal 560 which signal pattern corresponds to at least one pre-defined signal pattern of the library of allowed signal patterns, the aircraft 10 may be allowed to continue approaching the stand.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. An airport stand arrangement comprising:
a display;
a radar-based system; and
one or more additional systems selected from laser-based systems only;
wherein said radar-based system and said one or more additional systems together form a combined system,
wherein the airport stand arrangement is configured, based on output data from said combined system, to detect and track an aircraft within a stand area when said aircraft is approaching a stand within the stand area for parking at a parking position therein, and configured, based on said detection and tracking of the approaching aircraft, to provide pilot maneuvering guidance information on said display for aiding a pilot of the approaching aircraft in maneuvering the aircraft towards said parking position,
wherein output data from the radar-based system includes radar-based detection and tracking data but is absent of image data, and
wherein the airport stand arrangement is configured to detect and track the approaching aircraft based on
a spatially resolved weighted average of combined output data from said radar-based system and from said one or more additional systems, wherein the spatially resolved weighted average is determined based on statistical weights for the radar system and the one or more additional systems, respectively.

2. The airport stand arrangement according to claim 1, wherein the airport stand arrangement is configured to determine the statistical weights based on associated output data from the respective systems of the combined system.

3. The airport stand arrangement according to claim 2, wherein the airport stand arrangement is configured to determine a visibility based on output data from said one or more additional systems and determine said statistical weights based on said visibility.

4. The airport stand arrangement according to claim 1, wherein two or more systems of the combined system each are distanced from each other so as to, at each position in time, detect the approaching aircraft using different collection angles.

5. The airport stand arrangement according to claim 4, wherein at least one system of the combined system is arranged such that an associated area of coverage thereof extends over a portion of the stand area which portion at least partly overlaps with a part of the stand area being blocked, by a blocking structure in the stand area, from detection and tracking using remaining systems of the combined system.

6. The airport stand arrangement according to claim 5, wherein the blocking structure in the stand area is a passenger bridge.

7. The airport stand arrangement according to claim 5, wherein said at least one system is arranged on, or at, the blocking structure.

8. The airport stand arrangement according to claim 1, wherein the airport stand arrangement is further configured to determine a visibility based on output data from one or more of said additional systems, and in response to said visibility being lower than a first visibility threshold, to detect and track the approaching aircraft based on output data from the radar-based system.

9. The airport stand arrangement according to claim 8, further comprising wireless transmitting means, and wherein the airport stand arrangement is configured, in response to said visibility being lower than a second visibility threshold, lower than said first visibility threshold, to wirelessly transmit, using the wireless transmitting means, a signal comprising said pilot maneuvering guidance information to the approaching aircraft.

10. The airport stand arrangement according to claim 1, wherein an area of coverage of the radar-based system extends further out from the parking position than associated areas of coverage of said one or more additional systems as defined along a direction along which the approaching aircraft is expected to enter the stand area,
wherein the airport stand arrangement is configured to, based on output data from the radar-based system, detect and track the approaching aircraft in the area of coverage of the radar-based system for allowing the approaching aircraft to approach the stand and enter into the associated areas of coverage of the one or more additional systems, and
whereby the airport stand arrangement is configured to, based on output data from said one or more additional systems, detect and track the approaching aircraft within associated areas of coverage of said one or more additional system.

11. The airport stand arrangement according to claim 10, wherein the airport stand arrangement is further configured to, based on the output data from said one or more additional systems, determine an aircraft type and/or model of the approaching aircraft based on output data from said one or more additional systems.

12. The airport stand arrangement according to claim 11, wherein the airport stand arrangement is further configured, in response to the airport stand arrangement being unable to determine the aircraft type and/or model of the approaching aircraft, to provide further pilot maneuvering guidance information instructing the pilot to stop the aircraft.

13. The airport stand arrangement according to claim 10, wherein the airport stand arrangement is further configured to, by use of a laser-based system of the one or more additional systems, detect a backscattering signal originating from a volume at the stand area, and
in response to the airport stand arrangement being able to detect said backscattering signal:
provide further pilot maneuvering guidance information instructing the pilot to approach the stand,
determine if a signal pattern of the backscattering signal corresponds to at least one pre-defined signal pattern of a library of allowed signal patterns, and
in response to the airport stand arrangement being unable to determine if a signal pattern of the backscattering signal corresponds to the at least one pre-defined signal pattern of the library of allowed signal patterns:
detect and track the approaching aircraft based on output data from the radar-based system, and
in response to the airport stand arrangement being unable to detect said backscattering signal:
provide further pilot maneuvering guidance information instructing the pilot to stop the aircraft.

14. The airport stand arrangement according to claim 1, wherein said airport stand arrangement is further configured:
to, as a first determination step, determine whether an aircraft is present or not at said parking position based at least on output data from said one or more additional systems, and
to, in response to a negative determination in said first determination step and as a second determination step, determine whether an aircraft is present or not at said parking position based on output data from said radar-based system;
to transmit an aircraft-present-signal in response to a positive determination in any of said first and second determination steps; and
to transmit an aircraft-not-present-signal in response to a negative determination in both of said first and second determination steps.

15. The airport stand arrangement according to claim 1, wherein said arrangement is further configured to detect and track other objects within the stand area.

16. The airport stand arrangement according to claim 15, wherein said arrangement is further configured to detect and track said other objects within the stand area in parallel with said detection and tracking of the approaching aircraft during said maneuvering of the approaching aircraft towards the parking position.

17. The airport stand arrangement according to claim 16, wherein said arrangement is further configured to predict if the approaching aircraft is on a collision course with any of said other objects, and, in response to a collision course being predicted, to provide further pilot maneuvering guidance information instructing the pilot to stop the aircraft.

18. The airport stand arrangement according to claim 15, wherein the airport stand arrangement is configured to, based on at least a speed and direction of each of said other objects and a speed and direction of the approaching aircraft, determine if said other objects are predicted to leave the stand area before the approaching aircraft is predicted to arrive, and, in response to determining that said other objects are not predicted to leave the stand area before the approaching aircraft is predicted to arrive: to provide further pilot maneuvering guidance information instructing the pilot to stop the aircraft.

19. The airport stand arrangement according to claim 15, wherein the airport stand arrangement is configured to identify an event at the stand area based on the detection and tracking of said other objects within the stand area.

20. The airport stand arrangement according to claim 19, wherein the airport stand arrangement is configured to identify an event at the stand area based on selectively detecting and tracking an object of said other objects at a specific location at the stand area, wherein said specific location is determined based on an aircraft type and/or model of the aircraft in the stand and output data from the combined system.

21. The airport stand arrangement according to claim 19, wherein the event is one from the list of: arrival of a food delivery truck, arrival of a baggage delivery truck, arrival of stop chocks at a wheel of the aircraft, arrival of a fueling truck, arrival of a passenger bus, arrival of a cleaning company, arrival of water supply, arrival of a waste truck and arrival of a ground power unit.

22. The airport stand arrangement according to claim 15, wherein said detection and tracking of said other objects is based on output data from the radar-based system, and wherein said detection and tracking of the approaching aircraft is based on output data from said one or more additional systems.

23. The airport stand arrangement according to claim 1, wherein under a condition the airport stand arrangement determines a visibility within the stand area due to adverse weather conditions is lower than a visibility threshold, the airport stand arrangement applies a greater statistical weighting to output data from the radar system than for the one or more additional systems.

24. A method for detecting and tracking an aircraft within a stand area when said aircraft is approaching a stand within the stand area for parking at a parking position therein, wherein said detection and tracking is based on output data from a radar-based system and output data from one or more additional systems selected from laser-based systems only, the method comprising:
   determining a visibility based on output data from one or more of said one or more additional systems in response to said visibility being lower than a first visibility threshold:
   detecting and tracking the approaching aircraft includes output data from said radar-based system, the output data from the radar-based system includes radar-based detection and tracking data but is absent of image data, wherein
   the detecting and tracking includes
      determining a spatially resolved weighted average of combined output data from said radar-based system and from said one or more additional systems, wherein the spatially resolved weighted average is determined based on statistical weights for the radar system and the one or more additional systems, respectively.

25. A non-transitory computer-readable medium comprising computer code instructions which when executed by a device having processing capability are adapted to perform the method according to claim 24.

* * * * *